C. A. DE GIERS.
PORTABLE LATHE TOOL.
APPLICATION FILED JAN. 31, 1921.
1,407,015.
Patented Feb. 21, 1922.
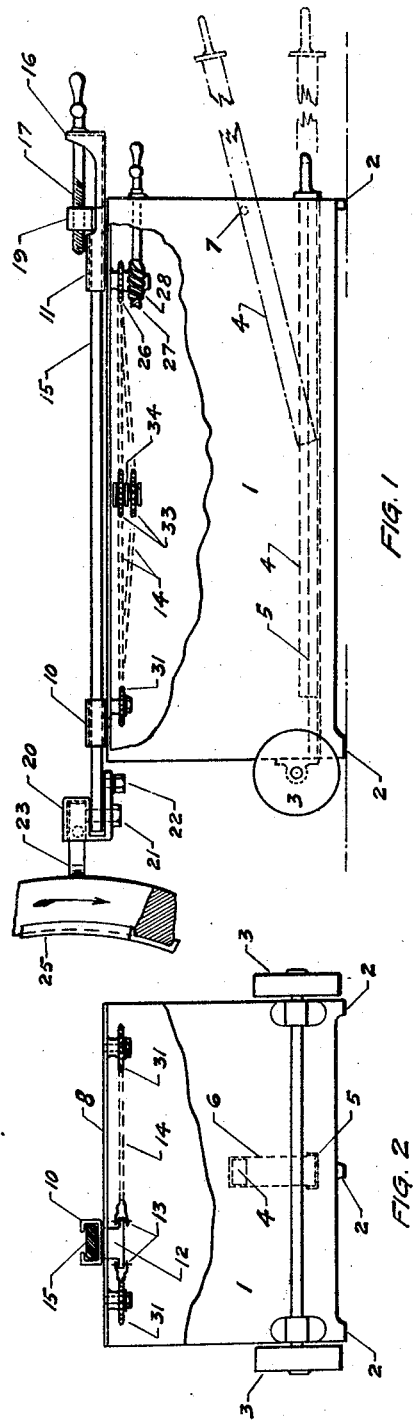
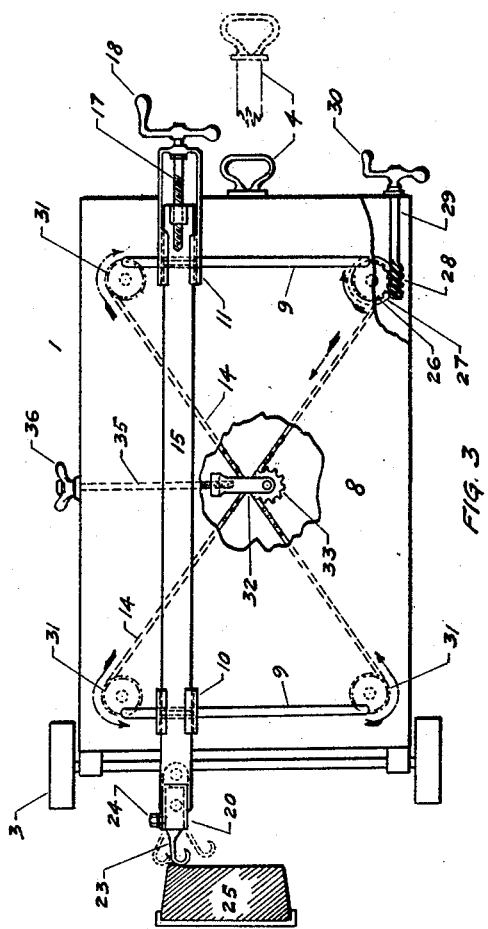
INVENTOR:
CLARENCE A. DE GIERS
BY: R. H. Waters
ATTORNEY

UNITED STATES PATENT OFFICE.

CLARENCE A. DE GIERS, OF NEW YORK, N. Y., ASSIGNOR TO KELLY SPRINGFIELD TIRE COMPANY, OF NEW YORK, N. Y., A CORPORATION OF NEW JERSEY.

PORTABLE LATHE TOOL.

1,407,015.

Specification of Letters Patent.  Patented Feb. 21, 1922.

Application filed January 31, 1921. Serial No. 441,337.

*To all whom it may concern:*

Be it known that I, CLARENCE A. DE GIERS, a citizen of the United States, residing at New York, in the county of New York and State of New York, have invented certain new and useful Improvements in a Portable Lathe Tool, of which the following is a specification.

My invention relates to a type of mechanism which may be styled a portable lathe tool for the reason that it includes a tool adapted to operate upon a rotating body, and transverse and longitudinal feeding means. The invention is applicable for use in any class of work wherein a circular section is rotated against the tool element, but is especially designed, as shown in the preferred form herein, for operating upon the periphery of a rubber tire, especially the type styled solid truck tires.

In the operation of truing the mutilated surface of a solid truck tire it is customary to "jack-up" the rear axle of the vehicle, cause the wheel being operated upon to rotate under the impulse of its own engine drive and bring the tool into contact therewith. In the application of this invention to the above purpose one of the objects sought is to provide a portable tool comprising means for feeding the cutting tool transversely and radially of the tire surface, the entire mechanism being self contained in a light, mobile structure capable of being positioned and manipulated by a single operator.

In the cutting of a substance having the property of rubber, such as is found in truck tires, being of an extremely tough and resilient nature, experience has demonstrated that stresses of intermittent frequency and varying intensity are encountered by the cutting tool and therefrom transmitted into the operating mechanism, tending to set up violent "chattering" in all moving parts having appreciable clearances. An object of my invention is to so proportion and design such moving parts that back-lash of gearing, lost motion and excessive clearances shall be eliminated, and to accomplish this desirable end in a simple and economical manner by the provision of means for maintaining a positive tension in the driving elements imparting motion to the tool transversely of the work.

The invention consists further in the certain novel features of construction and combinations of parts herein more fully set forth, claimed, and illustrated in the several drawings.

For a complete disclosure of my preferred form for practicing this invention attention is directed to the following description and to the accompanying drawing, in which:

Figure 1— is a side elevation of the device, a portion being broken away to more clearly illustrate the mechanical features.

Figure 2— is a front elevation, a section of the panel being broken away to more clearly illustrate the mechanical features.

Figure 3— is a plan view, having portions broken away near the center and at one corner to more clearly illustrate the mechanical features.

In the following detail description, similar numerals of reference denote corresponding parts throughout the several views of the drawing:—

Numeral 1 represents any suitable base, herein delineated as a substantially box-like structure, having three projecting support feet 2, two being in the front and one in the center of the rear panel. Mobility is secured by a pair of wheels 3 disposed on either side, journaled slightly beyond the front panel, and clear of the normal base line when the structure is at rest on its feet—to facilitate manual positioning of the device with respect of its work an extensible push bar 4 is provided, slidable in a channel 5, and vertically raisable in a restricted slot 6 in the rear panel from which its withdrawal is limited by means of a stop pin 7. It will thus be noted that the device, when lifted at its rear by means of the bar 4, will cause the wheels 3 to relieve the front feet 2 of their support and thus be free to trundle at will. The top plate 8 preferably of steel, is securely attached to the sides of the base 1 and is provided with a pair of parallel slots 9 cut transversely of the top and in parallelism of each other. Slidable within slots 9 are tool bar carriages 10 and 11, each having a thin deep lug 12 extending within and through said slots and fashioned with pin carrying extensions 13 adapted to receive the separated ends of the flexible carriage puller 14. Both carriages, 10 and 11, are fashioned to retain within them a longitudinally slidable tool bar 15; carriage 11 having a rearwardly extending part 16 in which is journaled a screw bolt 17 adapted to be rotated by a hand crank 18, the forwardly extending shank of said bolt being threaded to engage a nut 19 fashioned on the rear end of the tool bar 15. The forward end of tool bar 15 is provided with a tool holder 20, said tool holder being pivotally journaled on a pin 21 for horizontal adjustment. An extension rearwardly on the tool holder 20 is provided and thereon a set screw 22 adapted to clamp the holder against the tool bar 15 in any desired angular adjustment. Within the tool socket of 20 is a tool 23, held therein by a suitable set screw 24. Tool 23 is illustrated in the form of a cutter having a rounded cutting edge, it being noted that the pivoted tool holder 20 permits of exposing new cutting surfaces of the tool 23 to the work—the object being cut is illustrated as a rubber tire 25, which in Figure 1 is shown in operable contact with the tool and the work being rotated downwardly onto the tool in the direction of the arrow. In Figure 3 is shown a plan view of the tire in cross section in contact with the tool 23, and thereon, in dotted lines, the pivotal adjustment of the tool is illustrated in seeking new cutting surfaces. Transverse parallel feed of the tool bar 15 is attained by driving the flexible carriage pullers 14 which are in two sections, and shown as sprockets chains, each end thereof being attached to the extensions 13 on lugs 12 of the carriages 10 and 11 respectively (see Figure 2); driving of chains 14 is attained by means of the sheave 26 (shown as a sprocket tooth member positively engaging the carriage puller chains 14); this member 26 is non-rotatably secured to the driven worm wheel 27, the combined element being journaled on a pin suitably secured to the under side of the top plate 8. This worm wheel 27 is actuated by a worm 28 in a shaft 29 terminating in a manually operated crank 30. Change in direction of the carriage chains 14 is effected by leading them over three idler sheaves, illustrated as sprocket wheels 31, which are suitably journaled on pins attached to the under side of the top plate. To maintain tension on chains 14 a tension device is provided comprising a bifurcated element 32 having chain guide sprocket type sheaves 33, and between them a chain separator or tongue 34, said sheaves being journaled on a pin common to both; the stock of element 32 is threaded to register with the engaging end of a threaded bolt 35 extending beyond the side of the base and fashioned with an extension 36 by means of which the bolt may be rotated to draw upon the tension device 32.

Having thus completely disclosed an operable device for carrying my invention into practice only a general statement of its operation will be given. In Figs. 1 and 3 a rubber truck tire is illustrated in position to be operated upon by the tool; this tire may be one mounted on the rear wheel of a motor vehicle, in which event it is the practice to "jack-up" the rear axle until the tire is off the ground and set up reverse rotation of the wheels by the machine's own power unit; on the other hand the tire may be set up in a suitable chuck, off the vehicle, and rotated in the direction of the arrow, in order that rotation may be downward upon the tool.

The entire device, being readily portable, may be trucked into position to suit the work. It will be noted that by drawing out the handle 4 an operator is enabled to easily lift the rear end, the structure pivoting about its front feet 2 until such angle of tilt is reached as will transfer the load onto the wheels 3, within which condition of balance the machine may be readily trundled about at will.

When aligned with its work the tool bar is run over to any desired lateral position as found necessary by operation of the crank 30, the tool is then advanced at will by the crank 18 to attain any desired cut. In the drawings, Figs. 2 and 3, the tool bar is illustrated close to its limit of travel transversely of the work. It will be observed that the tool may be manually operaed to plane off a layer of the tire of any desired depth, also that it may be made to perform grooving operations. In order that there shall be no lost motion in the driving mechanism a chain tightener has been provided, Figures 1 and 3; this consists of suitable idler sprockets meshing into each of the oppositely moving portions of the chain at their cross-over; also in conjunction therewith a spacer plate, or tongue, has been transposed between the sprockets to avoid the possibility of contact of the crossing chains at this point.

In order that the round-end cutter tool shall serve the maximum time without removal to sharpen, a pivoted tool holder is shown, whereby various portions of the cutting edge may be made to do useful work.

Having thus described my invention, I claim as new therein and desire to secure by Letters Patent:

1. A device of the character described, comprising: a mobile base; transverse guides in parallel relation adapted to slidably retain therein tool bar carriages; tool bar carriages slidable within the guides; flexible driving means associated with the carriages and adapted to move them equally in parallelism; means for imparting linear motion to the carriage driving means; a tool bar slidable within the carriages; a tool holder on the tool bar having a tool therein; and means on one of said carriages for moving the tool bar longitudinally toward and away from the work.

2. A device of the character described, comprising: a mobile base provided with wheels; a top plate having parallel guide slots therein adapted to slidably retain therein tool bar carriages; tool bar carriages slidable within the slots; a sprocket chain associated with the carriages and adapted to move them equally in parallelism; a driven sprocket wheel engaging the carriage chain and means on the sprocket to rotate same whereby linear motion will be imparted to said chains; a tool bar slidable within and retained by the carriages, and having at one end thereof a tool holder and tool and at the other end thereof means for engaging the bar sliding mechanism; and means on one of said carriages associated with the engaging means on the tool bar for moving the tool longitudinally toward and away from the work.

3. In a device of the character described, the combination with a mobile base having a tool bar thereon, means for moving the tool bar laterally and longitudinally; and means associated with the mechanism for lateral motion, comprising a sprocket chain and four sprocket sheaves, one of which is the driven member and three being idlers adapted to change the linear direction of the chain to attain parallel motion in one direction of the tool bar carriages, and a chain tensioner engaging each of the chains at their crossing, said tensioner comprising a pair of sprocket idlers adapted to positively intermesh with the chain and means for separating the chains at their crossing.

4. In a device of the character described, the combination of a base having a pair of wheels thereon, disposed forwardly thereof and vertically of the plane of horizontal rest, feet on the base extending below the lowest point of the wheels, two such feet being disposed adjacent the wheels, whereby the wheels will support the base when it is tipped forwardly; and a lathe tool mechanism associated with the base, substantially as described.

5. In a device of the character described, the combination of a base having a pair of wheels thereon, disposed forwardly thereof and vertically of the plane of horizontal rest, two feet on the base at the forward corners thereof and one foot on the base at the center of the rear panel, said feet extending below the lowest point of the wheels, whereby the load will be transferred from the feet onto the wheels when the base is tipped forwardly, an extensible lifting handle normally housed within the base and movable rearwardly and upwardly in an opening in the rear panel, and a stop member thereon to limit the withdrawal therefrom; and a lathe tool mechanism associated with the base, substantially as described.

6. A device of the character described, comprising a portable base; a tool bar thereon longitudinally slidable in carriages, flexible carriage driving means having guides associated therewith, whereby linear motion of said flexible driving means moves said carriages equally in parallelism.

7. A device of the character described, comprising a base, carriages on the base slidably mounted in parallel relation, flexible driving means adapted to move the carriages equally in either direction, means for regulating the tension on the flexible driving means, a tool bar slidably mounted within the carriages and means associated with one carriage for moving the tool bar toward and away from its work in the direction of its length.

In testimony whereof I affix my signature.

CLARENCE A. DE GIERS.